(12) United States Patent
Kim (10) Patent No.: US 9,573,625 B2
(45) Date of Patent: Feb. 21, 2017

(54) FRONT SIDE MEMBER FOR VEHICLE

(71) Applicant: HYUNDAI MOTOR COMPANY, Seoul (KR)

(72) Inventor: Do Hoi Kim, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/719,198

(22) Filed: May 21, 2015

(65) Prior Publication Data
US 2016/0129941 A1    May 12, 2016

(30) Foreign Application Priority Data
Nov. 10, 2014    (KR) .......................... 10-2014-0155359

(51) Int. Cl.
| | | |
|---|---|---|
| B62D 21/15 | (2006.01) | |
| B60R 19/02 | (2006.01) | |
| B62D 25/08 | (2006.01) | |

(52) U.S. Cl.
CPC ........... *B62D 21/152* (2013.01); *B60R 19/023* (2013.01); *B62D 25/082* (2013.01)

(58) Field of Classification Search
CPC ... B62D 25/082; B62D 25/088; B62D 25/085; B62D 21/152; B62D 21/155
USPC ........... 296/187.09, 193.09, 203.02; 280/784
See application file for complete search history.

(56) References Cited

U.S. PATENT DOCUMENTS

| | | | | |
|---|---|---|---|---|
| 6,241,310 B1* | 6/2001 | Patelczyk | ............ | B62D 23/005 296/203.01 |
| 7,695,052 B2* | 4/2010 | Nusier | ................. | B62D 21/152 293/133 |
| 9,033,398 B2* | 5/2015 | Verbrugge | ............ | B21C 23/085 296/187.03 |
| 2003/0090127 A1* | 5/2003 | Saeki | ................... | B62D 21/152 296/187.12 |
| 2004/0145217 A1* | 7/2004 | Hanyu | ................. | B62D 21/152 296/204 |
| 2006/0201227 A1* | 9/2006 | Lepre | ........................ | B21C 1/24 72/370.14 |
| 2008/0238146 A1* | 10/2008 | Nusier | ................. | B62D 21/152 296/193.09 |
| 2011/0233961 A1* | 9/2011 | Verbrugge | ............ | B21C 23/085 296/187.03 |
| 2012/0153679 A1* | 6/2012 | Yasuhara | ............. | B62D 21/152 296/203.02 |

(Continued)

FOREIGN PATENT DOCUMENTS

| | | |
|---|---|---|
| JP | 3690459 B2 | 8/2005 |
| JP | 3748093 B2 | 2/2006 |

(Continued)

OTHER PUBLICATIONS

Machine Translation of JP2008-162478-A, printed from the JPO website, Apr. 3, 2016.*

*Primary Examiner* — Jason S Morrow
(74) *Attorney, Agent, or Firm* — McDermott Will & Emery LLP (57) ABSTRACT

A structure of a front side member of a vehicle includes a front side member body mounted to a lower right side and a lower left side of the vehicle and extending along a length direction of the vehicle. The front side member includes a variable thickness part formed along the length of the vehicle and having a thickness that varies along the height of the vehicle.

11 Claims, 8 Drawing Sheets

(56) References Cited

U.S. PATENT DOCUMENTS

2013/0320710 A1* 12/2013 Watanabe ............ B62D 25/082
                                                                                      296/187.09
2014/0167450 A1* 6/2014 Sotoyama ............ B62D 21/152
                                                                                       296/187.09

FOREIGN PATENT DOCUMENTS

| JP | 2007-112212 A | 5/2007 |
| JP | 2008-162478 A | 7/2008 |

* cited by examiner

FIG. 1

-- Prior Art --

FRONT SIDE MEMBER FOR VEHICLE

CROSS-REFERENCE TO RELATED APPLICATION

This application claims the benefit of priority to Korean Patent Application No. 10-2014-0155359 filed in the Korean Intellectual Property Office on Nov. 10, 2014, the entire content of which is incorporated herein by reference.

TECHNICAL FIELD

The present disclosure relates to a front side member for a vehicle, more particularly to a front side member for a vehicle having a variable thickness structure along the height of the vehicle along the length of the vehicle.

BACKGROUND

A front vehicle body forms an engine compartment located in the front along the length of a vehicle. The front vehicle body includes a front end module forming a front part of the engine compartment and equipped with a cooling module and a head lamp, etc. A front fender apron member is provided at left and right sides of the engine compartment and forms a space for wheels as well as a suspension system. A dashboard is provided between front seats of the vehicle and the engine compartment. The front vehicle body further includes a front side member extending along the length of the vehicle in a lower part of the engine compartment and disposed from the left to right sides in the width of the vehicle, and a subframe supporting a suspension system, an engine that is disposed in the engine compartment, a transmission, and so on.

Figure 1:
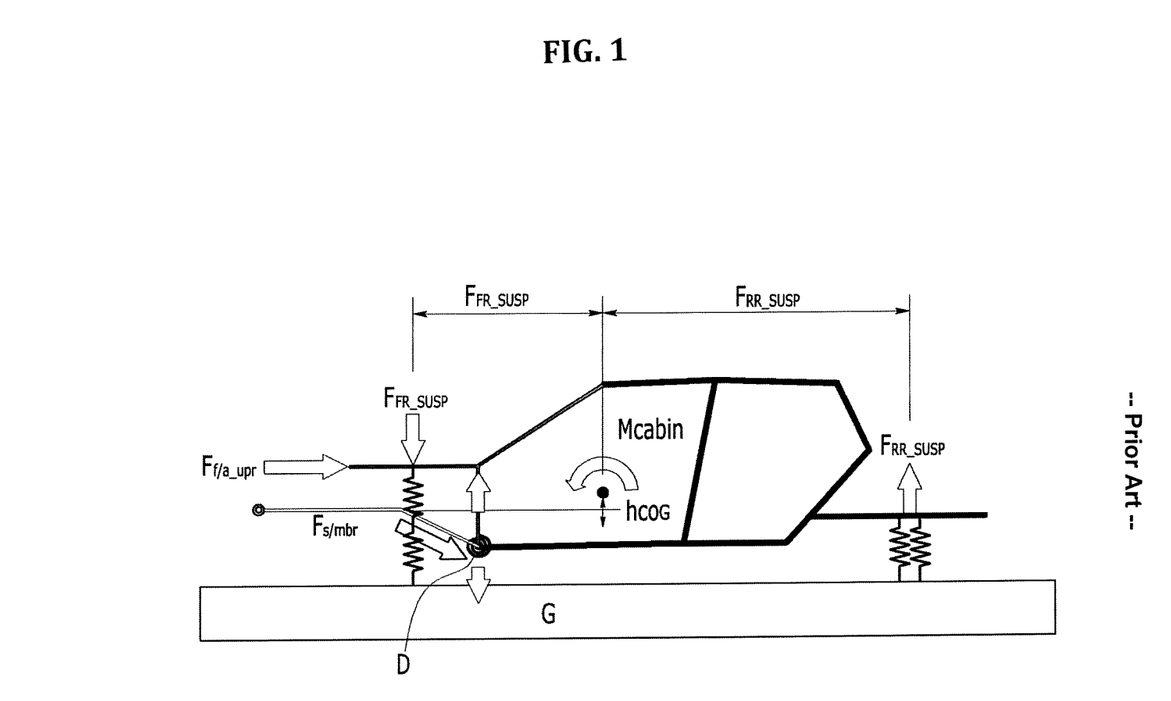
FIG. 1 is a brief modeling drawing illustrating a conventional vehicle body.

FIG. 1 illustrates a conventional vehicle structure described above in which, $h_{COG}$ represents the center of mass of a vehicle, $M_{cabin}$ represents a moment of inertia of a vehicle body with the center of mass of the vehicle as a center, $L_{FR\_SUSP}$ represents a distance from a front suspension to the center of gravity, $L_{RR\_SUSP}$ represents a distance from the center of mass to a rear suspension, $F_{FR\_SUSP}$ represents an external force applying on the front suspension, $F_{RR\_SUSP}$ represents an external force applying on the rear suspension, $F_{s/mbr}$ represents an external force applied to a front side member when the vehicle collides, $F_{f/a\_upr}$ represents an external force applied to a fender apron upper member when the vehicle collides.

When the vehicle collides with a front obstacle, since the front side member extends farther than the fender apron upper member along the length direction of the vehicle, an impact is applied to primarily on the front side member as the external force $F_{s/mbr}$ and then applied to the fender apron upper member as the external force $F_{f/a\_upr}$.

The external impact $F_{s/mbr}$ applied to the front side member generates the moment $M_{cabin}=F_{s/mbr}*h_{COG}$ which rotates the vehicle body in a counterclockwise direction with the center of mass $h_{COG}$, and the external force $F_{FR\_SUSP}$, which presses the vehicle body from the top to the bottom in a height direction of the vehicle is applied on the front suspension by the moment $M_{cabin}$. The external force $F_{FR\_SUSP}$, which lifts up the vehicle body from the bottom to the top along the height of the vehicle, is applied on the rear suspension.

Additionally, the above-described moment $M_{cabin}$ causes sinking, in which a front side of the vehicle and a vibration measuring part D subside to the ground G, as shown with the arrow in FIG. 1. Such a sinking phenomenon deteriorates safety of a passenger, for example, by deteriorating airbag performance when the vehicle collides with the obstacle.

Therefore, it is necessary to improve the vehicle structure in order to enhance the safety of the passenger by reducing the sinking amount when a vehicle collision occurs.

The above information disclosed in this Background section is only for enhancement of understanding of the background of the inventive concept, and therefore, it may contain information that does not form the prior art that is already known in this country to a person of ordinary skill in the art.

SUMMARY

An aspect of the present inventive concept provides a front side member for a vehicle that enhances safety of a passenger by reducing a sinking phenomenon when a vehicle collision occurs.

A front side member according to an exemplary embodiment of the present inventive concept includes a front side member body mounted to a lower right side and a lower left side of the vehicle and extending along a length direction of the vehicle. The front side member includes a variable thickness part formed along the length of the vehicle and having a thickness that varies along the height of the vehicle.

The front side member body may further include a front horizontal body formed along the length direction of the vehicle at a front side of the front side member. A rear downward sloping body is integrally connected to the front horizontal body and slantly extends downward toward a rear side of the vehicle.

The variable thickness part may be interposed between and connect the front horizontal body and the rear downward sloping body.

The variable thickness part may be disposed between an engine mount which fixes the front side member a shock absorber position corresponding part.

The thickness of the variable thickness part may gradually decrease downwards along the height of the vehicle.

The front side member body may have square box shape formed by an upper side, a lower side, an interior side, an exterior side. The variable thickness part may be formed on the interior side and the exterior side.

The variable thickness part may be formed on the interior side and the exterior side of the front side member body.

The variable thickness part formed on the interior side and the exterior side of the front side member body may include an upper portion, middle portion, and a lower portion formed along the height direction of the vehicle, and the thickness of the thickness variable part gradually decreases downwards in the height direction of the vehicle.

The variable thickness part may have stepwise surfaces at both sides thereof to decrease the thickness of the variable thickness part from the upper portion to the lower portion.

The variable thickness part may have a straight surface at one side thereof and a stepwise surface at another side thereof to decrease the thickness of the variable thickness part from the upper portion to the lower portion.

The variable thickness part may have inclined surfaces at both sides thereof to decrease the thickness of the variable thickness part from the upper portion to the lower portion.

The variable thickness part may have a flat surface at one side thereof and an inclined surface at another side thereof to decrease the thickness of the variable thickness part from the upper portion to the lower portion.

The front side member of the vehicle according to the exemplary embodiment of the present inventive concept has a thickness decreasing part of which thickness decreases formed on a front side member body. The front side member body is disposed between an engine mount where an engine is mounted and a shock absorber position corresponding part where a shock absorber of a front suspension is located. If an external impact is exerted on the front side member at a collision, bending deformation occurs since the variable thickness part is thinner than neighboring parts of the front side member body.

Since the bending deformation occurs at an upper part of the vehicle, a bending phenomenon, in which the thickness decreasing part is bent in arch shape upward at a center, occurs. Such a bending phenomenon can lift a front vehicle body from the ground upwards, and decrease the sinking amount, thereby increasing safety of a passenger when collision occurs.

Further, overall weight of the front side member is decreased, and performance of the vehicle and fuel efficiency can be improved.

DETAILED DESCRIPTION OF THE EMBODIMENTS

Herein, exemplary embodiments of the present inventive concept are described by reference to the drawings attached.

Figure 2:
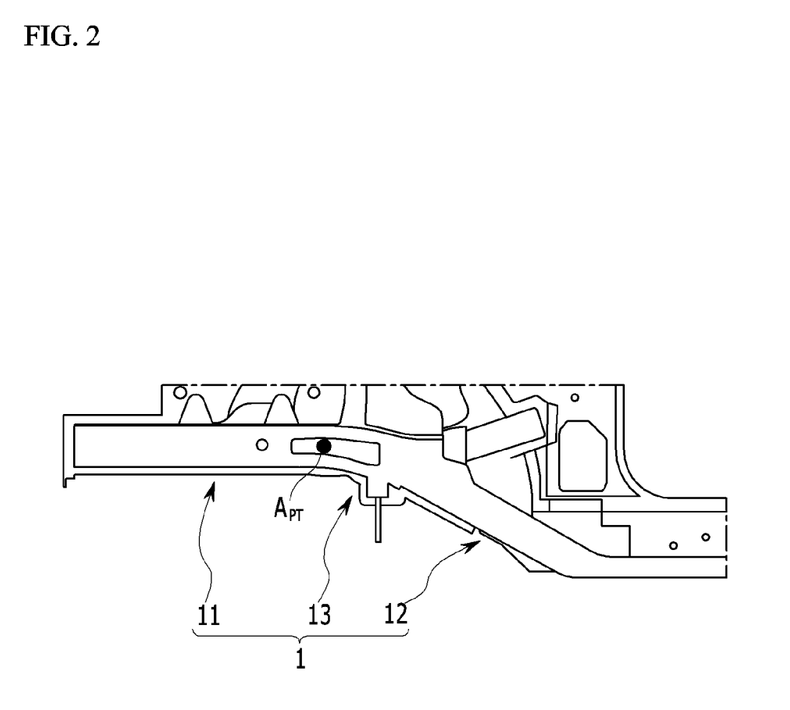
FIG. 2 is a side view of a front side member for a vehicle according to an exemplary embodiment of the present inventive concept.

Referring to FIG. 2, a front side member of a vehicle according to an exemplary embodiment of the present inventive concept may include a front side member body 1 extending along a length direction of the vehicle.

The front side member body 1 may be mounted at both right and left sides of the vehicle and include a front horizontal body 11 horizontally extending along the length direction of the vehicle. A rear downward sloping body 12 is integrally connected with the front horizontal body 11 and slantly extends downwards along the height of the vehicle, that is, extends toward the ground. A variable thickness part 13 may be formed between the front horizontal body 11 and the rear downward sloping body 12 along the length direction of the vehicle.

Figure 3:
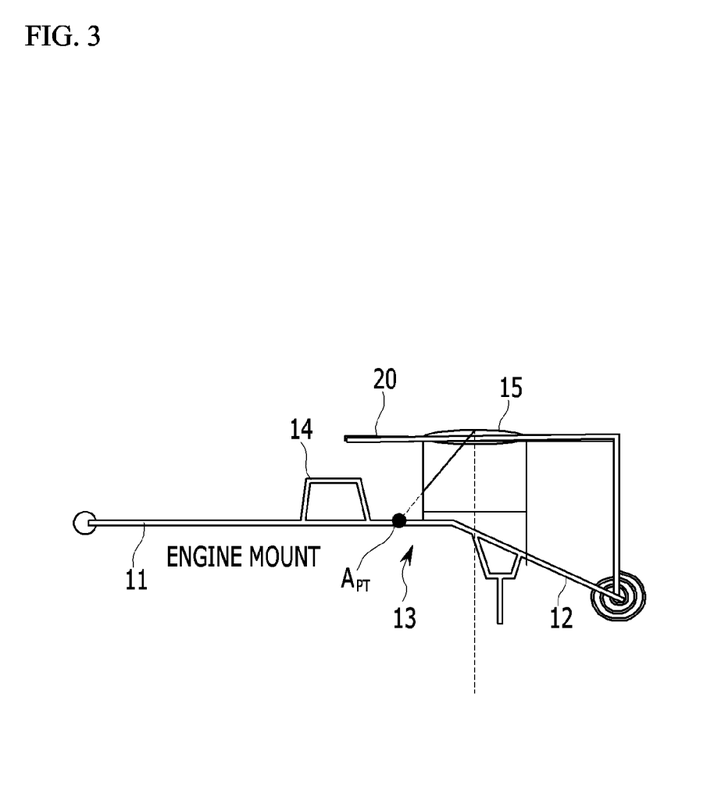
FIG. 3 is a schematic view of a front side member for a vehicle according to an exemplary embodiment of the present inventive concept.

Referring to FIG. 3, an engine mount 14 may be mounted on the front horizontal body 11 of the front side member body 1. The variable thickness part 13 is formed along the length direction of the vehicle and includes a center point $A_{pt}$ to determine a position of a shock absorber position corresponding part 15, at which a shock absorber (not shown) of a front suspension is located, to be spaced apart from the variable thickness part 13.

The engine mount 14 fixes and prevents the front side member 1 from being deformed due to heavy weight of the engine. The shock absorber position corresponding part 15 allows a front wheel and the front suspension to collide with an obstacle before crash energy is converted into potential energy due to the location of the front wheel.

The front side member body 1 further includes a fender apron upper member 20 installed above the front side member 1 in the height direction of the vehicle.

Figure 4:
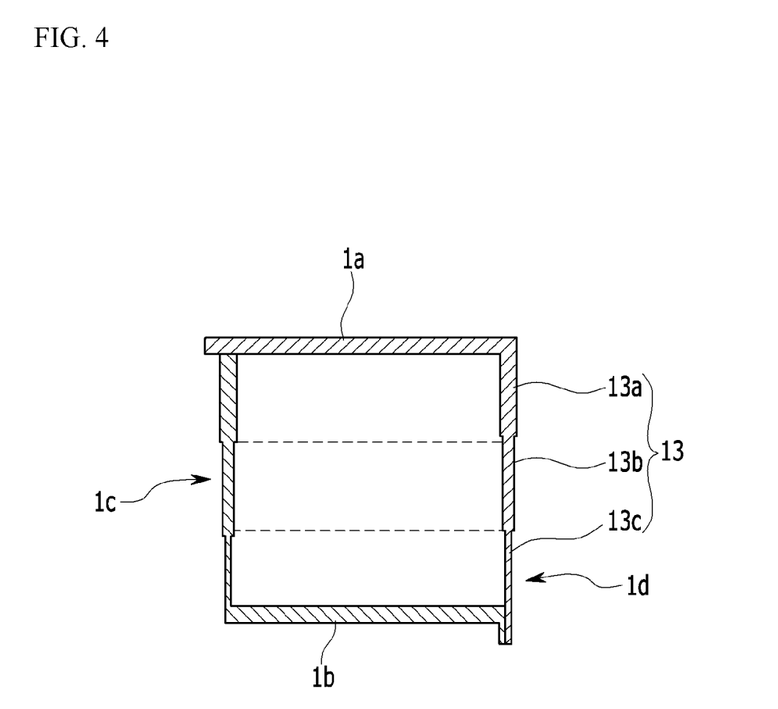
FIG. 4 is a cross-sectional view illustrating the front side member for a vehicle according to the exemplary embodiment of the present inventive concept.

FIG. 4 shows a cross-section view of the front side member body 1 having a square box shape therein and extending along the length direction of the vehicle.

The front side member body 1 having the square box shape therein includes an upper side 1a located at an upper side of the front side member body 1, a lower side 1b located at a bottom side of front side member body 1, an interior side 1c located at one side of the front side member body 1, and an exterior side 1d located at another side of the front side member body 1.

The variable thickness part 13 may have a structure in which a thickness thereof gradually decreases toward a lower side of the vehicle in the height direction of the vehicle. That is, the interior side 1c and exterior side 1d gradually decrease in the thickness toward the lower side of the vehicle in the height direction.

An upper portion 13a of the variable thickness part 13, which is located at the top of both sides facing each other, may be thickest, and a lower portion 13c, which is located at the bottom, may be thinnest. A middle portion 13b, which is located at a center, may be thinner than the upper portion 13a but thicker than the lower portion 13c.

Figure 5:
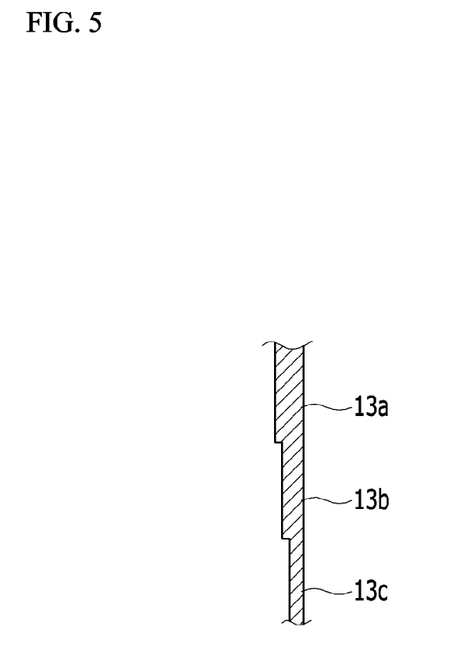
FIG. 5 is partial cross-sectional view illustrating a front side member for a vehicle according to another exemplary embodiment of the present inventive concept.

Referring to FIG. 5, the middle portion 13b and the lower portion 13c simultaneously decrease in their thicknesses toward downward, in which the middle portion 13b, the lower portion 13c, and the upper portion 13a have a flat surface at one side of the variable thickness part 13 and have a stepped surface at the opposite side.

Figure 6:
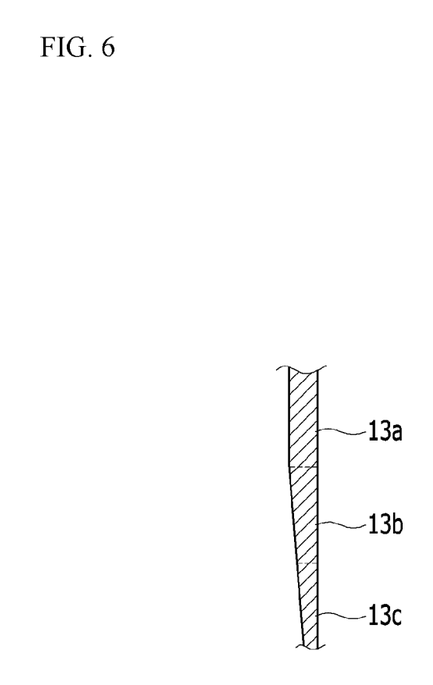
FIG. 6 is partial cross-sectional view illustrating a front side member for a vehicle according to yet another exemplary embodiment of the present inventive concept.
Figure 7:
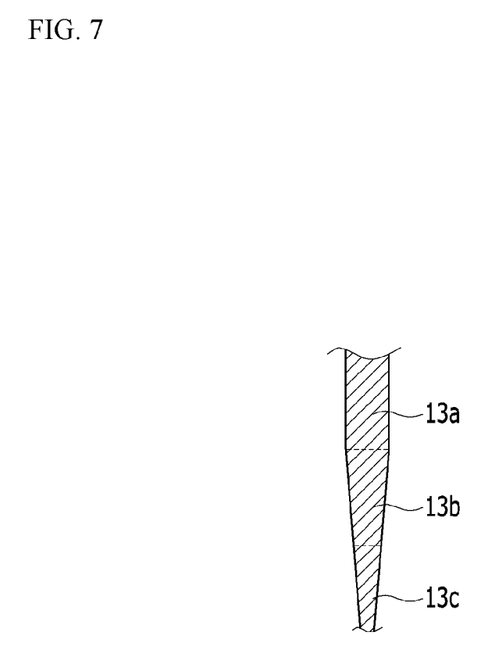
FIG. 7 is partial cross-sectional view illustrating a front side member for a vehicle according to yet another exemplary embodiment of the present inventive concept.

According to another exemplary embodiment, one side of the variable thickness part 13 from the upper portion 13a to the lower portion 13c may be inclined to linearly decrease the thickness of the variable thickness part 13 toward a lower side of the vehicle, or the thickness of the variable thickness part 13 decreases by inclined surfaces on both sides of the upper portion 13a to the lower portion 13c according to yet another exemplary embodiment.

When a front side crash occurs on the vehicle having the front side member of the present disclosure, crash energy is transferred to the front side member body 1. If there is an impact on the front horizontal body 11, the impact energy may be effectively absorbed and reduced by being compressed and deformed in the length direction of the vehicle.

Additionally, when a low speed crash occurs, the front horizontal body 11 is not excessively deformed by effectively absorbing and reducing low impact energy.

If the front crash continues, the impact energy is transferred to the variable thickness part 13 through the front horizontal body 11. The thickness of the variable thickness part 13, which has a relatively thin thickness, is compressed and bent.

Figure 8:
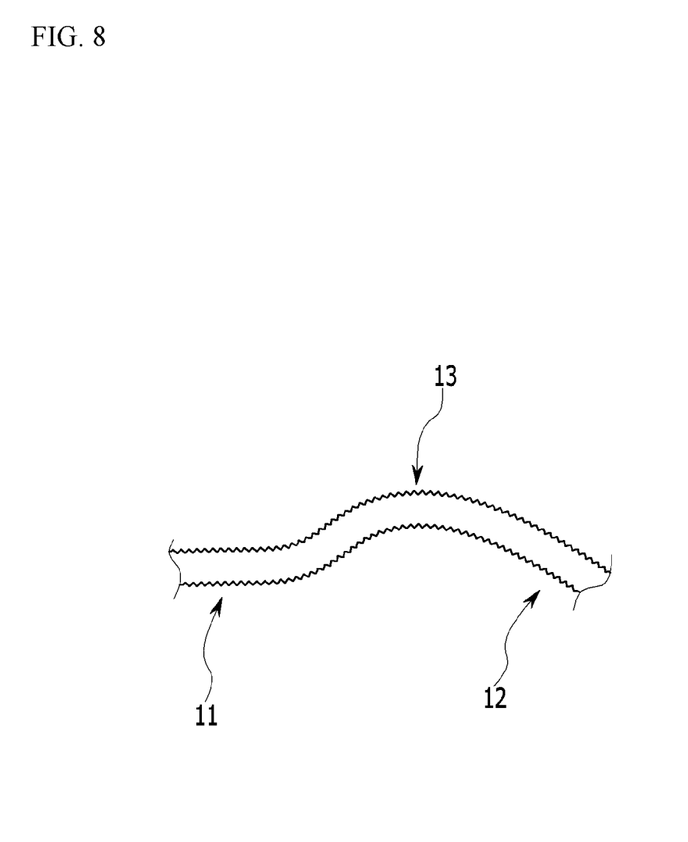
FIG. 8 is a drawing for describing a collision behavior of a front side member for a vehicle according to an exemplary embodiment of the present inventive concept.

Referring to FIG. 8, the front side member body 1 is curved upwardly in the height direction of the vehicle in which the variable thickness part 13 is bent in the height direction. Accordingly, sinking is decreased when a collision of the vehicle occurs, and safety of a passenger is enhanced.

While this inventive concept has been described in connection with what is presently considered to be practical exemplary embodiments, it is to be understood that the inventive concept is not limited to the disclosed embodiments, but on the contrary, is intended to cover various modifications and equivalent arrangements included within the spirit and scope of the appended claims.

What is claimed is:

1. A front side member for a vehicle, comprising:
    a front side member body mounted to a lower right side and a lower left side of the vehicle and extending along a length direction of the vehicle,
    wherein the front side member body includes a variable thickness part formed along the length direction of the vehicle and having a thickness that varies along a height direction of the vehicle, and
    wherein the thickness of the variable thickness part gradually decreases downwards in the height direction of the vehicle.

2. The front side member of claim 1, wherein the front side member body further includes:
    a front horizontal body formed along the length direction of the vehicle at a front portion of the front side member body; and
    a rear downward sloping body integrally connected to the front horizontal body and slantly extending downwards toward a rear side of the vehicle.

3. The front side member of claim 2, wherein the variable thickness part is interposed between and connects the front horizontal body and the rear downward sloping body.

4. The front side member of claim 1, wherein the variable thickness part is disposed between an engine mount which fixes the front side member and a shock absorber position corresponding part.

5. The front side member of claim 1, wherein the front side member body has square box shape formed by an upper side, a lower side, an interior side, and an exterior side, and
    the variable thickness part is formed on the interior side and the exterior side of the front side member body.

6. The front side member of claim 5, wherein the variable thickness part formed on the interior side and the exterior side of the front side member body includes an upper portion, middle portion, and a lower portion formed along the height direction of the vehicle, and the thickness of the thickness variable part gradually decreases downwards in the height direction of the vehicle.

7. The front side member of claim 6, wherein the variable thickness part has stepwise surfaces at both sides thereof to decrease the thickness of the variable thickness part from the upper portion to the lower portion.

8. The front side member of claim 6, wherein the variable thickness part has a straight surface at one side thereof and a stepwise surface at another side thereof to decrease the thickness of the variable thickness part from the upper portion to the lower portion.

9. The front side member of claim 6, wherein the variable thickness part has inclined surfaces at both sides thereof to decrease the thickness of the variable thickness part from the upper portion to the lower portion.

10. The front side member of claim 6, wherein the variable thickness part has a flat surface at one side thereof and an inclined surface at another side thereof to decrease the thickness of the variable thickness part from the upper portion to the lower portion.

11. The front side member of claim 1, wherein the front side member body further includes a fender apron upper member disposed above the front side member body in the height direction of the vehicle.

* * * * *